United States Patent [19]

Repecka

[11] Patent Number: 5,003,018
[45] Date of Patent: Mar. 26, 1991

[54] SLURRY MIXING OF BISMALEIMIDE RESINS

[75] Inventor: Linas N. Repecka, Lakewood, Calif.

[73] Assignee: BASF Aktiengesellschaft, Ludwigshafen, Fed. Rep. of Germany

[21] Appl. No.: 187,819

[22] Filed: Apr. 29, 1988

[51] Int. Cl.$^5$ .................. C08F 22/40; C08G 73/12
[52] U.S. Cl. .................... 526/262; 525/422; 525/432; 525/537; 528/322
[58] Field of Search ................ 526/262; 525/422, 423; 528/322

[56] References Cited

U.S. PATENT DOCUMENTS

| 4,035,345 | 7/1977 | Ducloux et al. | 528/322 |
| 4,100,140 | 7/1978 | Zahir et al. | 526/90 |
| 4,131,632 | 12/1978 | Suzuki et al. | 525/496 |
| 4,413,107 | 11/1983 | Locatelli | 526/262 |
| 4,742,141 | 5/1988 | Dien | 526/262 |
| 4,743,647 | 5/1988 | Domeier | 526/262 |
| 4,752,641 | 6/1988 | Koyama et al. | 526/262 |

Primary Examiner—Ana L. Carrillo
Attorney, Agent, or Firm—William G. Conger

[57] ABSTRACT

Bismaleimide-containing resin systems suitable for preparing structural adhesives and prepregs having superior tack and drape are disclosed. These resin systems, which have improved uniformity and superior resistance to microcracking, contain finely dispersed bismaleimide particles, and are produced by slurry mixing bismaleimide component(s) with one or more liquid comonomers.

19 Claims, No Drawings

SLURRY MIXING OF BISMALEIMIDE RESINS

BACKGROUND OF THE INVENTION

1. Field of the Invention

The subject invention relates to the preparation of heat-curable bismaleimide resin systems. More particularly, the subject invention relates to the preparation of bismaleimide resin systems in which the bismaleimide component(s) are slurry mixed at relatively low temperatures into the remaining resin system components. The greater homogeneity of the resulting resin systems allows the preparation of prepregs and adhesives with uniform properties, and unexpectedly increases the tack and drape of such products.

2. Background of the Related Art

Bismaleimide resins have recently become important resins of commerce for a variety of uses, for example, in printed circuit boards, as matrix resins for fiber reinforced composites, as structural adhesives, and as potting resins, to name but a few. However, bismaleimide resins, while possessing high strength at elevated temperatures, tend to be somewhat brittle. Thus it is common to modify the bismaleimides with additional comonomers to improve impact resistance. However, many of the comonomers are physically incompatible with the bismaleimide resins in the sense that following initial formulation at elevated temperatures, the bismaleimide component may crystallize during processing. The large crystals which then form result in a resin system which is heterogenous, difficult to process and which may be prone to microcracking when used to prepare carbon fiber reinforced composites. In such a resin system the bismaleimide concentration can vary widely. Furthermore, even when the bismaleimide components and other components are physically compatible, adhesives and prepregs prepared from these conventionally prepared systems often do not have the drape or tack desired of them.

SUMMARY OF THE INVENTION

It has been surprisingly discovered that homogenous bismaleimide-containing heat-curable resin systems may be obtained in a simple and expedient manner by slurry mixing at least a portion of the bismaleimide component into the remaining resin system components, preferably at much lower temperatures than are customarily used in formulating. Quite unexpectedly, it has been found that the tack and drape of film adhesives and fiber reinforced prepregs prepared with the use of such resin systems are superior to prepregs containing an otherwise identical resin formulation but prepared in the conventional manner.

DESCRIPTION OF THE PREFERRED EMBODIMENTS

The process of the subject invention involves the slurry mixing of one or more solid bismaleimide monomers with other resin system components, preferably at lower temperatures than otherwise would be required to effect mutual solubility of these components. Upon cooling, the bismaleimide resin systems thus obtained contain very fine bismaleimide particles in the form of a stable dispersion. Upon standing, substantial crystallization of additional bismaleimide will not occur. The resulting heat-curable resin system is thus uniform and homogenous.

The term "resin system" as used herein refers to a heat-curable resin composition in its final form. Such resin systems may contain one or more reactive monomers and/or comonomers, curing agents, any necessary catalysts, and optionally fillers, rheology control agents, tackifiers, tougheners, diluents, dyes, and pigments, but exclusive of fiber reinforcement. This term is commonly used in the structural materials field when referring to heat-curable compositions having use as structural adhesives, hot melt and solution type prepregging resins, and as matrix resins in heat-curable prepregs.

The term "incompatible comonomer(s)", as used herein, refers to comonomers and other ingredients which, when present, would allow crystallization of a particular bismaleimide component upon cooling a melt of such components. The incompatible comonomer may thus comprise one or more additional components having chemical functionalities other than maleimide, as well as other bismaleimide comonomers.

For example, it might be found that a homogenous melt of specific quantities of a particular bismaleimide monomer and a comonomer, for example o,o'-diallylbisphenol A, might not present a problem with regard to crystallization of the bismaleimide on cooling. However, when a second bismaleimide, or when more of the first bismaleimide are added to the melt, substantial crystallization might occur under the same conditions. The resulting crystallization indicates incompatibility, in the sense used by the inventor, between the added bismaleimide and the other ingredients. Such incompatibility is most likely to result when high concentrations of bismaleimides are utilized, particularly when high concentrations of a single or limited number of bismaleimides are utilized.

The foregoing procedure serves as a useful test for compatibility. In this test, the particular bismaleimide component is added to the remaining components in the melt and agitated in a conventional manner to obtain a uniform mixture. If, upon cooling, substantial crystallization takes place, then there is physical incompatibility between the components. This procedure may also be completed in reverse, with additional ingredients being added to a melt of one or more bismaleimides. If upon cooling substantial crystallization of one or more of the bismaleimides takes place, then again, there is physical incompatibility. By substantial crystallization is meant crystallization by means of which numerous crystals or crystallites greater than approximately 20–50 $\mu$m in size can be detected. The presence of such crystals can be determined readily through microscopic examination.

The use of the slurry mixing process in the preparation of homogenous bismaleimide resin systems containing incompatible components is but one mode of practicing the subject invention. This mode is important when large quantities of a single bismaleimide are contained in the resin formulation, as such formulations, when prepared conventionally, are frequently very difficult to process. For example, the resin films, adhesive films, and prepregs prepared from such systems are generally tack-free and have poor drape. Moreover, the large crystals of bismaleimides which many of these formulations contain may actually be filtered out of prepregs during impregnation, as the crystal size is greater than the distance between adjacent fiber bundles.

However, it has been surprisingly discovered that the use of the slurry mixing process is highly important even when the overall resin system components are not incompatible. Such resin systems may result, for example, when the total bismaleimide component is made up of a number of bismaleimides, each of which is present in an amount lower than the solubility of that component in the resin system. Such resin systems may also result when a compatible rather than an incompatible comonomer is utilized. An example of the latter might be the use of a bismaleimide monomer and a cyanate-functional comonomer.

In either of the two latter cases, the resin system, upon cooling, will generally not show the presence of large or substantial amounts of crystals. In some cases, the resin system may have the appearance of a solid solution or glass. Yet despite the uniform appearance, these resin systems frequently possess virtually no tack, and often are highly brittle. Surprisingly, when the same components are slurry mixed, the resulting resin system has excellent tack and drape.

The claimed heat-curable resin systems of the subject invention contain from 1.0 to about 90 percent by weight of one or more solid bismaleimide monomers. Such monomers are well known to those skilled in the art, and are generally prepared by the reaction of maleic anhydride, or substituted maleic anhydrides such as methylmaleic anhydride, with a suitable diamine. Both aromatic and aliphatic diamines are suitable for the preparation of the bismaleimide.

Suitable diamines include, for example, aromatic diamines such as the various toluene diamines and methylene dianilines. Other aromatic diamines which are useful include 1,3- and 1,4-phenylenediamine, and the 2,2'-, 2,4'-, 3,3'-, and 4,4'- diaminodiphenylsulfones, diaminodiphenylisopropylidenes, diaminodiphenylketones, diaminodiphenyloxides, and diaminodiphenylsulfides.

Suitable aliphatic diamines include the linear and branched $C_2$–$C_{20}$ alkylene diamines, for example ethylenediamine, 1,3-propylenediamine, 1,4-butylenediamine, 1,5-pentanediamine, 1,6-hexanediamine, 1,8-octanediamine, 1,10-decanediamine, 1,12-dodecanediamine, 2,2,4-trimethyl-1,6-hexanediamine, isophoronediamine, 1,3- and 1,4-cyclohexanediamine, xylylenediamine, and diamines containing the tricyclodecane structure derived from dicyclopentadiene.

Bismaleimides derived from diamines containing heteroatoms are also useful, for example those derived from amino terminated polyethersulfones, polyetherketones, polyetherketoneketones, polyetheretherketones and similar oligomers as prepared in accordance with U.S. Pat. No. 4,175,175, as well as amino terminated polyoxyalkylene polyethers, amino terminated N,N-dialkylpiperidines, and the like.

Also useful are polyaminobismaleimide prepolymers which may be prepared through the reaction of a stoichiometric excess of one or more bismaleimides with a di- or polyamine. Such polyaminobismaleimides or related products may also be prepared in situ by including in the resin system, one of the aforementioned diamines, preferably one of the diaminodiphenylsulfones.

The so-called eutectic bismaleimides which are mixtures of two or more different bismaleimide monomers are also useful. Through the use of such mixtures, the melting point of the bismaleimide component may be considerably depressed over the melting point of the separate bismaleimide monomers. Preferably, ternary or higher mixtures are utilized, for example mixtures containing the bismaleimides of the toluenediamines, diaminodiphenylmethanes, and one or more aliphatic diamines such as 1,8-octanediamine, 1,12-dodecanediamine, or 2,2,4-trimethyl-1,6-hexanediamine. Such eutectics are readily available in commercial embodiments.

The resin systems of the subject invention also contain one or more comonomers. These comonomers may be comonomers which react with the bismaleimide monomers, or which react with themselves or with other comonomers or may be the same or a different bismaleimide resin in liquid form. Such comonomers include, for example, alkenylphenols and alkenyl ethers as disclosed in U.S. Pat. Nos. 4,100,140 and 4,035,345, which are herein incorporated by reference; allylnadicimide resins; epoxy resins; di- and polyamines; cyanate resins; unsaturated polyester resins; and alkenylphenol-terminated oligomeric tougheners similar to those disclosed in European published application 230,741. Silicone rubbers may also be utilized as comonomers, particularly those terminated with maleimide, epoxy, and amino groups. In addition to such comonomers, the resin systems of the subject invention may also include engineering thermoplastic tougheners, particularly polyimides, polyetherimides, polyetherketones, polyetherketoneketones, polyetheretherketones, polyarylenesulfides, polyarylenesulfones, polyethersulfones, and the like. Such thermoplastic tougheners should have glass transition temperatures, Tg, in excess of about 150° C.

Preferred comonomers are the alkenylphenols and alkenyloxyphenyls. Suitable are, for example o,o'-diallyl- and o,o'-dipropenylbisphenols such as o,o'-diallyl- and o,o'-dipropenylbisphenol A, bisphenol F, and bisphenol S. Also suitable are the alkenylphenol- and alkenyloxyphenyl terminated dicyclopentadienes. The latter are prepared by first forming the phenolated dicyclopentadiene precursor as taught in U.S. Pat. No. 3,536,734. The precursor is then reacted with the requisite alkenylhalide such as allyl chloride or propenyl chloride in the presence of base to form the allyl or propenyl ether. These ethers may be used as such or may be isomerized through Claisen rearrangement to the ortho substituted phenol. Allyl groups may be isomerized to propenyl groups, if desired, as taught by J. Am. Chem. Soc., 78 pp 1709-13 (1956). The preferred comonomers may be characterized as having a formula

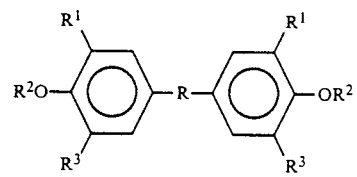

wherein R is an organic diradical containing from 1 to about 40 carbon atoms, wherein $R^1$ and $R^2$ may be hydrogen, or substituted or unsubstituted methallyl, allyl, propenyl, or propargyl groups, but wherein $R^1$ and $R^2$ may not both be hydrogen, and wherein $R^3$ may be selected from $C_1$–$C_{12}$ lower alkyl, halo, halogenated lower alkyl, and $C_1$–$C_{12}$ lower alkoxy groups. The term alkenylphenol as used herein refers to substituted and unsubstituted alkenylphenols similar to the above, and equivalents thereof.

Allylnadicimides are also suitable as comonomers. These comonomers may be prepared by numerous methods, for example by Diels-Alder reaction between allyl-substituted cyclopentadiene and maleic anhydride followed by imidization with a suitable di- or triamine. The use and preparation of such comonomers is described in U.S. Pat. Nos. 4,666,997, and 4,667,003, which are herein incorporated by reference.

Suitable epoxy resins are disclosed in the treatise *Handbook of Epoxy Resins*, McGraw-Hill, Inc., ©1967. Examples of such resins are the bisglycidyl ethers of the bisphenols, particularly bisphenol A, bisphenol F and bisphenol S. Also suitable are the various phenolic and cresolic novolac-type resins, as well as the various glycidoxy amines and aminophenols, particularly N,N,N',N'-tetrakis(glycidyl)-4,4'-diaminodiphenylmethane and N,N,O-tris(glycidyl)-4-aminophenol. Epoxy resins based on the glycidyl ethers of the various dihydroxynaphthalenes and phenolated dicyclopentadienes are also suitable.

In conventional bismaleimide resins only limited amounts of epoxy resin comonomers are useful due to the epoxy resin precipitating out of solution as evidenced by U.S. Pat. Nos. 4,131,632 and 4,212,959. The use of the slurry mixing technique as taught by the subject invention allows a greater proportion of epoxy resin to be used as the fine resin particles which result have less of a tendency to settle out.

Cyanate functional comonomers are also useful. Such monomers are prepared by the reaction of cyanogen chloride or bromide with a diol or polyol. Examples of suitable diols include the bisphenols, resorcinol, the hydroxyalkylcyanurates and isocyanurates and the like. Such cyanate resins are well known to those skilled in the art, and are commercially available from a number of sources. Their preparation is also well known, and may be accomplished by the methods proposed in U.S. Pat. No. 4,546,131, for example.

The resin systems of the subject invention may also include other components, some of which may also affect the compatibility of the bismaleimide monomers. Catalysts are generally present, for example, in amounts of from 0.01 percent to about 5.0 percent by weight. Preferred catalysts include triphenylphosphine, the various tertiary amines, imidazoles, or diamines. The system may also contain various dyes, pigments, fillers, and rheology control agents. These additional components are well known to those skilled in the art.

The resin systems of the subject invention are prepared by dispersing the bismaleimide into the compatible or incompatible liquid comonomer in such a manner that a uniform dispersion is obtained. The process of forming such dispersions is termed "slurry mixing" and may be accomplished through several means. Some of these means are described below, while other equivalent means will readily suggest themselves to those skilled in the art of resin formulating.

In order to form the stable dispersions of the subject invention, the average particle size of the solid bismaleimide component must be kept below about 20 $\mu$m, preferably below 10 $\mu$m. Most preferably, the great majority of the particles range between 1 and 5 $\mu$m in size. The bismaleimide particle size may be obtained through traditional methods of size reduction, for example by precipitation from solution, air-jet milling, three-roll milling, or high-shear mixing. Preferably, the desired particle size is achieved through jet milling.

The continuous phase of the resin system may be defined as that portion of the resin system exclusive of the solid bismaleimide particles. The continuous phase generally contains any incompatible comonomer(s), and may additionally contain fillers, rheology control agents, pigments, catalysts, and the like. It may also, in certain cases contain compatible comonomers and liquid or dissolved bismaleimides. In order to maintain the required physical characteristics of the finished resin system, the continuous phase should most desirably have a viscosity of between about 200 cp and 2000 cp at temperatures of from about 90° C. to about 150° C. The continuous phase should have a low glass transition temperature, the value of which is dependent upon the particular application. Preferably, the continuous phase has a $T_g$ of about $-10°$ C. or less. These low $T_g$'s are desirable in order that the product, when in adhesive film or prepreg form, may have adequate tack and drape.

If the viscosity of the continuous phase is too low, it may be raised to a higher value by dissolving a portion of the bismaleimide into the other components in the traditional manner. Care must be taken to avoid dissolving so much bismaleimide at higher temperatures that the low temperature solubility is appreciably exceeded, as under these conditions bismaleimide may crystallize out. This crystallization is promoted by the presence of dispersed, solid bismaleimide in the finished resin system which may serve as nucleation sites for crystallization. If only minor amounts of crystallization take place, the nonhomogeneity thus produced may be attenuated by further processing, such as three-roll milling. However if substantial amounts of crystallization takes place, the product must be reworked or scrapped.

In the most preferred embodiment of the subject invention, slurry mixing of the resin systems is accomplished by dispersing the required quantity of bismaleimide in fine particle form, preferably as 1–5 $\mu$m particles, into the continuous phase. The slurry mixing generally takes place at modestly elevated temperature, above the solidification point of the continuous phase, preferably from 30° C. to about 100° C., but below the temperature at which the particular bismaleimide is soluble or miscible with the remaining components. At these relatively low temperatures, only a minor portion of the bismaleimide, if any, will dissolve into the continuous phase despite the small particle size of the bismaleimide.

Conventional high shear mixing equipment may be utilized. The cure catalyst may also be added at this stage, if desired, as the slurrying temperature is generally lower than conventional mixing temperatures and thus premature reaction and accompanying advancement of the resin may be avoided. The uniform dispersion thus obtained may be further processed on a three-roll mill, or may be directly coated onto silicone release paper for use as an adhesive or as a hot melt prepregging resin. Matrix resins prepared by this technique are particularly suitable for carbon/graphite and glass fiber applications.

Thus, the subject invention, in its most preferred embodiment, is a process for the preparation of a heat-curable resin system containing from about 1 to about 90 weight percent of at least one solid bismaleimide and one or more comonomers, comprising slurry mixing the solid bismaleimide in the form of particles having a mean size of less than about 30 $\mu$m, preferably less than about 20 $\mu$m, most preferably less than about 10 $\mu$m, and particularly less than about 5 $\mu$m, into a liquid comonomer at a temperature such that a substantial portion of the solid bismaleimide does not dissolve in the liquid comonomer(s).

By the term "liquid comonomer" is meant those components of the total resin system which, during the slurry mixing process, constitute the continuous phase. These components may be liquids, preferably viscous liquids, at room temperature. Examples of such liquid comonomers are certain of the eutectic blends of bismaleimides, certain tougheners such as diallylbisphenol A, and various epoxy and cyanate resins. The liquid comonomer may also be a solid at room temperature. In such a case, the slurry mixing process temperature must be elevated in order that these solid comonomers melt to form a liquid continuous phase. The temperature might also desirably be somewhat elevated even in the case of normally liquid comonomers when the viscosity of such comonomers is very high.

It is important that a substantial portion of the solid bismaleimide remain in solid form. The term "substantial portion" is best defined in terms of the amount of solid bismaleimide which does dissolve during the slurry mixing process when practiced by adding fine particle size bismaleimide to the liquid coingredients. This portion must be such that following the slurry mixing process, the resin film or prepreg prepared from the heat-curable resin system has the desired tack and drape, and that substantial crystallization of the solid bismaleimide component(s) does not occur.

For example, in many systems, the portion of solid bismaleimide which dissolves will be close to zero weight percent, and is generally less than about 20 weight percent of the total solid bismaleimide component added. However, in some cases, an appreciable amount of solid bismaleimide may dissolve and yet the product heat-curable resin system may still have the properties desired. Thus the "substantial portion" of bismaleimide which remains in solid form will vary along with the other system components. Preferably, the amount of solid bismaleimide which dissolves during slurry mixing will not appreciably exceed the storage temperature solubility of that particular bismaleimide. The "substantial amount" of bismaleimide remaining in solid form may, in some cases, be as low as 10 weight percent of added solid bismaleimide, but is generally and preferably much higher.

To further clarify the meaning of the term "substantial portion", reference may be made to the following prophetic examples which in theory result in the preparation of identical, heat-curable resin systems. Both resin systems contain three solid bismaleimides, Bis-A, Bis-B, and Bis-C, and a common comonomer, diallylbisphenol A (DABA). For purposes of clarity, the catalyst has been omitted from these examples. Let us assume that a liquid eutectic containing 20 weight percent Bis-A, 40 weight percent Bis-B, and 40 weight percent Bis-C is commercially available. The system formulations are presented below in Table I. All parts are in parts by weight.

TABLE I

| Component | Resin System A | Resin System B |
| --- | --- | --- |
| Diallylbisphenol A (DABA) | 40 | 40 |
| Eutectic Bismaleimide | 50 | — |
| Bis-A | 10 | 20 |
| Bis-B | — | 20 |
| Bis-C | — | 20 |
|  | 100 | 100 |

In terms of overall bismaleimide content, each of the above formulations contains a total of 20 parts Bis-A, 20 parts Bis-B, and 20 parts Bis-C.

Resin system A might be conveniently prepared by heating, while stirring, the DABA and the eutectic bismaleimide to a temperature of c.a. 170° F. (77° C.) to form a uniform homogenous liquid. Then the additional Bis-A component, as a finely divided solid having a particle size less than about 5 μm would be added. Stirring would continue until a uniform dispersion results. Only a small proportion, less than about 10 percent of the added Bis-A, or about 1 part, might dissolve. The cooled resin system would consist of a uniform dispersion of solid Bis-A in a very viscous continuous phase.

System B might be prepared by heating DABA to 170° F. (77° C.) and slowly adding Bis-B and Bis-C to the mixture while stirring. Eventually, a homogenous solution will result. Then the Bis-A (20 parts) in finely divided form (<5 μm) is slowly added. Under these conditions, 11 parts of Bis-A might dissolve in the system, leaving 9 parts of solid Bis A particles. The cooled resin system will be substantially identical with Resin system A. Both systems would be expected to have excellent tack and drape.

Thus, as can be seen from these examples, the actual amount of solid bismaleimide which dissolves may be dependent on the overall system composition and order of mixing. Thus in system B, more than 50 percent of the solid bismaleimide dissolved. The important factor is, however, that a substantial amount does remain in solid form, and that the resulting resin systems have good drape and tack without the appearance of substantial amounts of crystallized bismaleimide.

To contrast these examples with an example not contemplated by the subject invention, assume either of the following two hypothetical situations, each based upon a composition otherwise identical to that of Resin System B in Table I but prepared at a more elevated temperature.

As the solubility of bis A at the higher mixing temperature is likely exceeded, all or substantially all of the Bis-A will dissolve. Upon cooling, two possibilities exist. Most likely, upon cooling, large crystals of Bis A will form. Many of these crystals will have sizes in excess of 20–50 μm, some even in excess of 100 μm. A second possibility, although one not likely to occur in practice, is that the composition, if cooled quickly, may supercool. Under these conditions, it is quite likely that the metastable, supercooled, (and supersaturated) resin system may change its morphology over time in an unpredictable manner due to spontaneously induced crystallization. Of course, the more viscous the system, the slower such crystallization is apt to be. In neither case is a substantial quantity of added, solid bismaleimide present in the form of small, i.e. <5 μm particles. Neither system would be expected to have the tack and drape of the subject resin systems.

A less preferable means of slurry mixing the components in accordance with the subject invention is to heat the bismaleimide component above its melting point and add it slowly to the continuous phase under conditions of high shear. The mixture may be cooled down to a temperature below the melting point of the bismaleimide either before the start of liquid bismaleimide addition, during the course of the addition, or following the addition. However, it is necessary that the high shear conditions be maintained during the addition and cooling processes in order that the desired bismaleimide fine particle size may be maintained. This method is impractical when using bismaleimides with particularly high melting points. It is also not of use, and therefore not within the scope of the subject invention, when the liquid system is prone to supercooling. Under these conditions, a metastable resin system, initially containing no solid bismaleimide dispersed therein, will be obtained.

In another, less preferred method, the solid bismaleimide is added in the form of relatively coarse particles to the continuous phase under high shear such that the shear forces result in rapid size reduction to a range below 20 μm, preferably from 1 to about 5 μm. Shear mixers suitable to create the desired conditions are available commercially, for example as the ULTRA-TURRAX® mixers available from IKA-Maschinenbau Janke and Kunkel GMBH Co. KG., D-7812 Bad Krozingen 2, Federal Republic of Germany. When using such high shear mixers, the resin mixtures must often be cooled, as the heat buildup which results from the high energy shear conditions would otherwise raise the temperature of the resin by an undesirably high amount. The temperature must be kept appreciably below the temperature at which complete solubility of the solid bismaleimide would result.

A further means of practicing the subject invention is to first fuse together at least a portion the resin ingredients, including a portion of the total bismaleimide component, in a conventional manner. Then, the additional solid bismaleimide is added at a lower temperature, either as fine particles of suitable size, or as larger particles followed by in situ size reduction, for example by using the high shear mixing technique previously described.

The mixing temperature is critical to the optimal use of the process of the subject invention. This temperature should be as low as is practical for the resin components involved. For example, if suitable high torque mixers are available, slurry mixing of bismaleimides into even highly viscous comonomers may be accomplished at room temperature or below. However, it is frequently desirable to elevate the mixing temperature by a modest amount. With comonomers which are solid at room temperature or too highly viscous, elevated temperatures may be necessary. The most desirable temperature may easily be determined by one of ordinary skill in the art.

For example, in the preparation of bismaleimide resin systems by conventional techniques, at least one of the reactive monomers is melted following which the remaining comonomers, which may be either molten or solid, are added. The mixture is then agitated at elevated temperatures until a homogenous solution is obtained. At this point, the mixture is cooled to a lower temperature before the catalyst is added.

In order to effectuate solution of bismaleimide into the comonomers using conventional processing, temperatures in the range of 245° F. (118° C.) to 320° F. (160° C.), most commonly about 305° F. (152° C.) are used. Additional ingredients such as pigments and fillers are added at a lower temperature, for example 240° F. (116° C.), while the catalyst, for obvious reasons, is added at a still lower temperature, for example 177° F. (80° C.).

By way of contrast, using a similar formulation, slurry mixing by means of the process of the subject invention may take place at from 160° F. (71° C.) to 180° F. (82° C.) or below, at times even at room temperature.

In addition, the catalyst and other ingredients may be added at the same time, without resorting to a time consuming cooling operation and without fear of premature resin advancement.

The slurry mixing process has broad applicability to many resin systems. In particular, it may be useful in epoxy resin systems where at least one epoxy resin or comonomer, other than the epoxy curing agent, is a solid, and at least one portion of the overall resin system is liquid. Various reactive toughening agents which are solids may be added in this manner and yet produce tacky prepregs and adhesives.

In cyanate resin systems, it is possible, using the slurry mixing technique, to slurry mix solid cyanate functional resins or solid epoxy resins into liquid cyanate monomers and yet produce prepregs, films, and adhesives which exhibit good tack.

The invention may be illustrated by reference to the following examples.

EXAMPLE 1 (COMPARATIVE)

Into a resin kettle maintained at a temperature of 121° C. was introduced 713 grams of a molten eutectic mixture of bismaleimides. After the bismaleimides had melted, 268 grams of o,o'-diallylbisphenol A was introduced slowly while stirring. Following the addition of the diallylbisphenol, stirring was continued while the temperature was allowed to drop to approximately 80° C. At this temperature, an additional 20 grams of diallylbisphenol containing 5 weight percent of catalyst was added. The mixture was coated onto silicone coated release paper and used to fabricate a unidirectional carbon/graphite prepreg by the hot melt impregnation method. The prepreg thus prepared had poor drape and less than the desired amount of tack.

EXAMPLE 2

Into a resin kettle was introduced 268 grams of o,o'-diallylbisphenol A comonomer at room temperature. Mixing was commenced with an ULTRA-TURRAX® 600 watt mixer as a result of which the temperature of the comonomer rose to above 38° C. Next, 713 grams of the same eutectic mixture of bismaleimides as used in Example 1 was added using external cooling, when necessary, to keep the temperature below 93° C. Prior to addition, the bismaleimide had been coarsely crushed and sieved to a particle size of less than about 3 mm. After the addition of bismaleimide was completed, an additional 20 grams of diallylbisphenol A containing 5 weight percent of curing catalyst was added at a temperature below 82° C. The finished resin system was coated onto silicone coated release paper and used to prepare a carbon/graphite prepreg as in Example 1. Microscopic examination reveals no large crystals of bismaleimide, but discloses instead a uniform dispersion of particles having a size below about 20 μm. The prepreg prepared from the resin of Example 2 displayed superior drape and improved tack as compared to the otherwise identical prepreg of Example 1.

EXAMPLE 3 (COMPARATIVE)

A resin formulation was made by dissolving 2.1 g of the finely ground bismaleimide of 4,4'-diaminodiphenylmethane into 3.5 g of bis[4-cyanato-3,5-dimethylphenyl]-methane comonomer. Dissolution was accomplished by stirring the ingredients together at 300° F. (149° C.) for a period of five minutes. The resin was then poured into an aluminum foil dish whereupon it solidified into a brittle, transparent brown solid of glassy appearance. Upon flexing the dish the resin immediately cracked. The resin was not at all sticky to the touch (tack-free).

EXAMPLE 4

A resin formulation was prepared identical to that of Example 3, but the same finely ground bismaleimide (>50% having particle size between 2 and 3 μm) was slurry mixed into the cyanate comonomer component over a 15 minute period at a temperature of 200° F. (93° C.). The resin was then poured into an aluminum dish as before. After cooling to room temperature, the resin was semi-sold which did not crack when flexed, and which was sticky to the touch (tacky).

EXAMPLE 5

A solid bismaleimide having a mean particle size of 8 μm was fed into a lab jet mill at a rate of 18 g/minute by means of a vibratory funnel. The mill contained a 10 cm inside diameter by 2.5 cm deep milling chamber, and was fed compressed air at 90 psig via a 12.5 mm inside diameter hose. The venturi line pressure was maintained at about 60 psig. The milled particles were collected in product bags and were found to have a particle size such that 85 percent of the particles were below 4 microns in size.

EXAMPLE 6

A eutectic mixture containing approximately 64 weight percent, 15 weight percent, and 21 weight percent respectively of the bismaleimides of methylene dianiline, trimethylhexamethylene diamine, and toluene diamine is melted, and then cooled to 250° F. (121° C.). To 1000g of this bismaleimide mixture, is added, with stirring, 800 g of o,o'-diallylbisphenol A. This mixture is allowed to cool to 160° F. (71° C.) at which temperature 400 g of the jet milled bismaleimide of Example 5 is added, and dispersed well using a Fawcett air mixer, model No. 103A, with a high shear blade. Mixer speed is 700 rpm. The resin system is then catalyzed at 160° F. (71° C.) and coated at this temperature onto a silicone coated release paper to produce a tacky resin system having good drape.

The embodiments of the invention in which an exclusive privilege or property is claimed are defined as follows:

1. A process for the preparation of a heat-curable resin system containing from about 1 to about 90 weight percent based upon the total resin system weight of at least one solid bismaleimide, and one or more comonomers, comprising: slurry mixing said solid bismaleimide in the form of particles having a mean size of less than about 30 μm into a liquid comonomer at a temperature such that a substantial portion of said solid bismaleimide does not dissolve in said liquid comonomer.

2. The process of claim 1 wherein said solid bismaleimide means particle size is less than about 10 μm.

3. The process of claim 1 wherein said solid bismaleimide mean particle size is less than about 5 μm.

4. The process of claim 1 wherein said liquid comonomer is selected from the group consisting of bismaleimide resins, epoxy resins, alkenylnadicimide resins, cyanate-functional resins, and alkenylphenol terminated resins, alkenyloxyphenyl-terminated resins.

5. The process of claim 2 wherein said liquid comonomer is selected from the group consisting of bismaleimide resins, epoxy resins, alkenylnadicimide resins, cyanate-functional resins, and alkenylphenol terminated resins, phenyl-terminated resins.

6. The process of claim 3 wherein said liquid comonomer is selected from the group consisting of bismaleimide resins, epoxy resins, alkenylnadicimide resins, cyanate-functional resins, and alkenylphenol terminated resins, alkenyloxyphenyl-terminated resins.

7. The process of claim 6 wherein said comonomer is an alkenylphenyl or alkenyloxyphenyl-terminated oligomer.

8. The process of claim 6 wherein said comonomer is selected from the group consisting of the dialkenylbisphenols.

9. The process of claim 8 wherein said dialkenylbisphenol is o,o'-diallylbisphenol A.

10. The process of claim 6 wherein said comonomer is selected from the group consisting of the alkenyloxyphenylated and alkenylphenylated dicyclopentadiene oligomers.

11. In a process for the preparation of heat-curable bismaleimide resin-containing systems wherein from 1 weight percent to about 90 weight percent of one or more bismaleimide monomers, based upon the total resin system weight, is combined with one or more comonomers and other resin system components, the improvement comprising:
    (a) employing as the comonomer a bismaleimide-incompatible comonomer; and
    (b) slurry mixing at least a portion of said bismaleimide into at least a portion of said resin system; such that the total resin system contains bismaleimide particles uniformly dispersed in said resin system,
wherein the average particle size of said bismaleimide particles is about 20 μm or less, and wherein substantial crystallization of additional solid bismaleimide upon cooling is prevented.

12. The process of claim 11, wherein said slurry mixing is performed by means of a high shear mixing apparatus.

13. The process of claim 11, wherein said incompatible comonomer is selected from the group consisting of alkenyl-group-containing comonomers or alkynl-group-containing comonomers having the formula

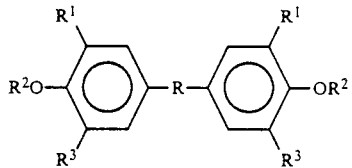

wherein R is an organic diradical containing from 1 to about 40 carbon atoms, and wherein $R^1$ and $R^2$ are selected from the group consisting of hydrogen methallyl, allyl, propenyl, and propargyl groups, with the proviso that when $R^1$ is hydrogen, $R^2$ is not hydrogen, and where $R^2$ is hydrogen, $R^1$ is not hydrogen, and wherein $R^3$ is selected from $C_1-C_{12}$ lower alkyl, halo, halogenated lower alkyl, and $C_1-C_{12}$ lower alkoxy groups.

14. The process of claim 11 wherein a portion of said bismaleimide monomer is first dissolved in said incompatible comonomer, while the remainder is added by means of slurry mixing.

15. The process of claim 11 wherein said bismaleimide is added to said incompatible comonomer in the melt, and wherein the resukting mixture is cooled while being subjected to mixing under high-shear.

16. A bismaleimide-containing resin system prepared by the process of claim 1.

17. A bismaleimide-containing resin system prepared by the process of claim 3.

18. A bismaleimide-containing resin system prepared by the process of claim 6.

19. A bismaleimide-containing resin system prepared by the process of claim 11.

* * * * *